(12) United States Patent
Sorab et al.

(10) Patent No.: US 7,077,776 B2
(45) Date of Patent: Jul. 18, 2006

(54) TRANSMISSION FLUID HEATING USING ENGINE EXHAUST

(75) Inventors: Jagadish Sorab, West Bloomfield, MI (US); Tom Tibbles, Livonia, MI (US); Michael Schroder, Northville, MI (US); John Glidewell, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 10/800,191

(22) Filed: Mar. 15, 2004

(65) Prior Publication Data

US 2005/0202933 A1    Sep. 15, 2005

(51) Int. Cl.
  *F16H 57/04*    (2006.01)
  *F25B 29/00*    (2006.01)
  *F28F 27/00*    (2006.01)

(52) U.S. Cl. .................. 475/161; 165/51; 165/276; 165/58; 165/96

(58) Field of Classification Search ............... 475/161; 477/97, 98; 123/142.5 R; 165/51, 253, 165/276, 300, 287, 58, 96
See application file for complete search history.

(56) References Cited

U.S. PATENT DOCUMENTS

| | | | |
|---|---|---|---|
| 2,193,304 A * | 3/1940 | Thompson | .................. 477/125 |
| 4,391,235 A * | 7/1983 | Majkrzak | ............. 123/142.5 R |
| 4,458,642 A | 7/1984 | Okubo et al. | |
| 4,685,430 A | 8/1987 | Ap | |
| 4,756,359 A | 7/1988 | Greer | |
| 5,505,164 A * | 4/1996 | Hollis | ....................... 123/41.1 |
| 5,551,384 A | 9/1996 | Hollis | |
| 5,724,931 A | 3/1998 | Hollis | |
| 6,112,713 A | 9/2000 | Kiel | |
| 6,151,891 A | 11/2000 | Bennett | |
| 6,217,758 B1 * | 4/2001 | Lee | ............................ 210/168 |
| 6,520,136 B1 * | 2/2003 | Ito et al. | ............... 123/142.5 R |
| 6,754,603 B1 * | 6/2004 | Turbett et al. | .............. 702/113 |

FOREIGN PATENT DOCUMENTS

| | | | |
|---|---|---|---|
| JP | 410318348 A | | 12/1998 |
| JP | 2002357265 A | * | 12/2002 |
| JP | 2003314673 A | * | 11/2003 |

* cited by examiner

*Primary Examiner*—Tisha Lewis
(74) *Attorney, Agent, or Firm*—David B. Kelley; MacMillan, Sobanski & Todd

(57) ABSTRACT

A heat exchanger integrated into the transmission oil pan transfers heat from post-catalyst exhaust gases to the transmission oil. Inlet and outlet ducts route exhaust gas between the heat exchanger and an exhaust pipe located downstream of the catalyst. The exhaust pipe accommodates a control valve that diverts exhaust gas flow to the heat exchanger during the warm-up phase, or to the tailpipe during steady state operation. A control function is provided to monitor transmission oil temperature and engine operating conditions and to control actuation of the valve. The main input parameter to the control function is the transmission oil temperature.

7 Claims, 3 Drawing Sheets

TRANSMISSION FLUID HEATING USING ENGINE EXHAUST

BACKGROUND OF THE INVENTION

The invention relates to heating transmission oil using engine exhaust heat. This system increases the temperature of transmission oil during the first several minutes of operation to achieve a fuel economy benefit. Thereafter, the system prevents the transmission oil from overheating.

Fuel economy improvement has been an important objective of automotive research. It is widely recognized that rapid warm up of engine lubrication oil and transmission fluid improve fuel economy by reducing frictional losses and viscosity-related drag losses. Most techniques for warming engine oil and transmission oil include use of heat exchangers that transfer heat from engine coolant to oil during a warm-up period. While this method is effective, it has potential problems. By transferring heat from the engine coolant to oil, less heat is available to warm the passenger compartment, which causes a noticeable delay to vehicle occupants especially during cold weather. Today's efficient engines produce less engine coolant heat; therefore, less heat is available from that source to heat engine oil and transmission oil.

U.S. Pat. No. 6,151,891 describes a heat exchanger for transferring heat from motor vehicle exhaust to transmission oil for the purpose of preheat the oil. U.S. Pat. No. 4,458,642 discloses a lubricant heating system for an internal combustion engine wherein a lubricant is directed into a heating chamber and heated by exhaust gases flowing in an exhaust pipe.

U.S. Pat. No. 5,724,931 discloses a system for controlling the heating of a temperature control fluid using the engine exhaust manifold. An electronic control unit receives signals from one or more sensors, which are indicative of ambient air temperature and engine oil temperature.

Japanese Patent Document 410318348A discloses an automatic transmission for an automobile wherein transmission oil is heated in a heat exchanger, which transfers heat from exhaust gas to the oil.

SUMMARY OF THE INVENTION

The invention relates to a method of heating transmission oil using post-catalyst exhaust heat. A system according to the invention includes a heat exchanger to transfer heat from post-catalyst exhaust gases to the transmission oil; a control valve that diverts exhaust gas flow to the heat exchanger during the warm up phase, or to the tailpipe during steady state operation; and a control function resident in a powertrain control module (PCM) that monitors temperatures, engine operating conditions and governs the actuation of the valve.

The system allows for the rapid warm up of transmission fluid from a cold start, thereby reducing frictional losses and improving fuel economy. The system increases the temperature of transmission oil during several minutes of operation to achieve a fuel economy benefit. Thereafter, the system prevents the transmission oil from overheating.

The arrangement offers significant benefits relative to systems that use engine coolant as a source of heat. It can deliver fuel economy benefit without affecting other vehicle attributes. It is simple to implement and calibrate. It offers a protection mechanism against overheating of the transmission oil. It provides a means for heating transmission oil at different temperatures based on ambient temperatures.

A system according to this invention for controlling the temperature of transmission fluid includes an oil pan for containing hydraulic fluid supplied to a transmission; a supply duct for carrying exhaust gas from an engine; a heat exchanger secured to the oil pan, communicating with the supply duct, and defining a flow path of exhaust gas along a surface of the oil pan, for transferring heat from the exhaust gas to the oil pan; an exhaust duct communicating with the supply duct, and connected to the heat exchanger for carrying engine exhaust gas from the heat exchanger to the supply duct; and a valve directing exhaust gas to the heat exchanger from the exhaust duct, and for bypassing exhaust gas flow to the heat exchanger.

A controller, supplied with information including the current fluid temperature and a target temperature, compares the fluid temperature to the target temperature, and produces a command signal to change the state of the valve in response to the determination. This command signal operates an actuator, which maintains the fluid temperature equal to or greater than the target temperature.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
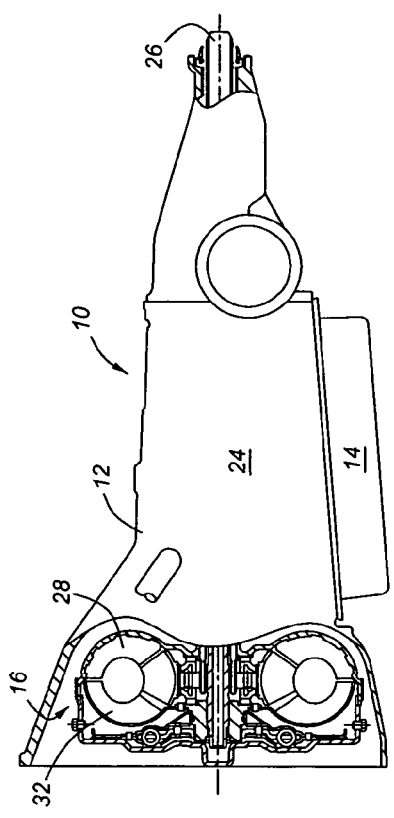
FIG. 1 is a side elevation view, partially in cross section, showing an automatic transmission case and oil pan to which this invention can be applied.

Referring now to the drawings, there is illustrated in FIG. 1 an automatic transmission 10 packaged in a case 12, and a transmission fluid reservoir or oil pan 14 located below and secured to the case. Located within the case 12, are the transmission components and subsystems including a hydrokinetic torque converter 16, gearing 24 and an output shaft 26. Transmission fluid, sometimes called "oil," circulates within the transmission in a hydraulic system under pressure produced by a hydraulic pump; flows from the case to an external oil cooler, which extracts heat from the fluid; and returns to the oil pan 14 from the cooler. Heat from the transmission fluid is exchanged in the cooler principally by convection to air passing at high speed between fins radiating from the lines that carry the fluid through the cooler and by conduction to surrounding fluid.

Figure 3A:
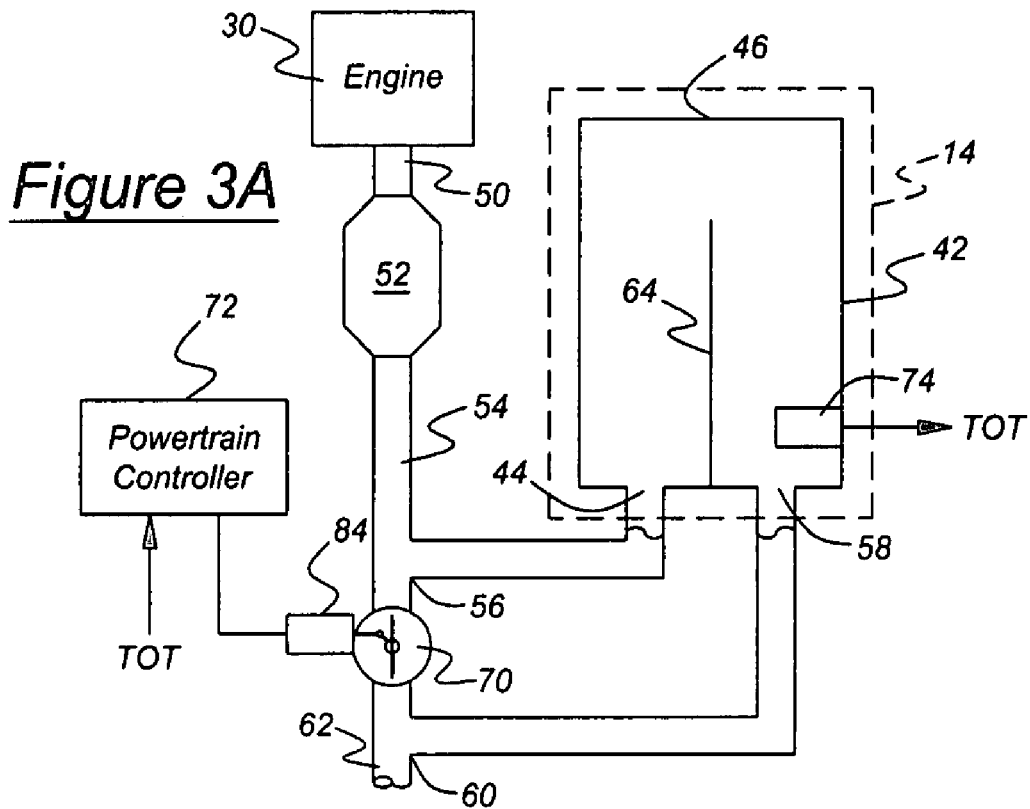
FIGS. 3A and 3B are schematic diagrams of a system for preheating transmission fluid contained in a transmission oil pan.
Figure 3B:
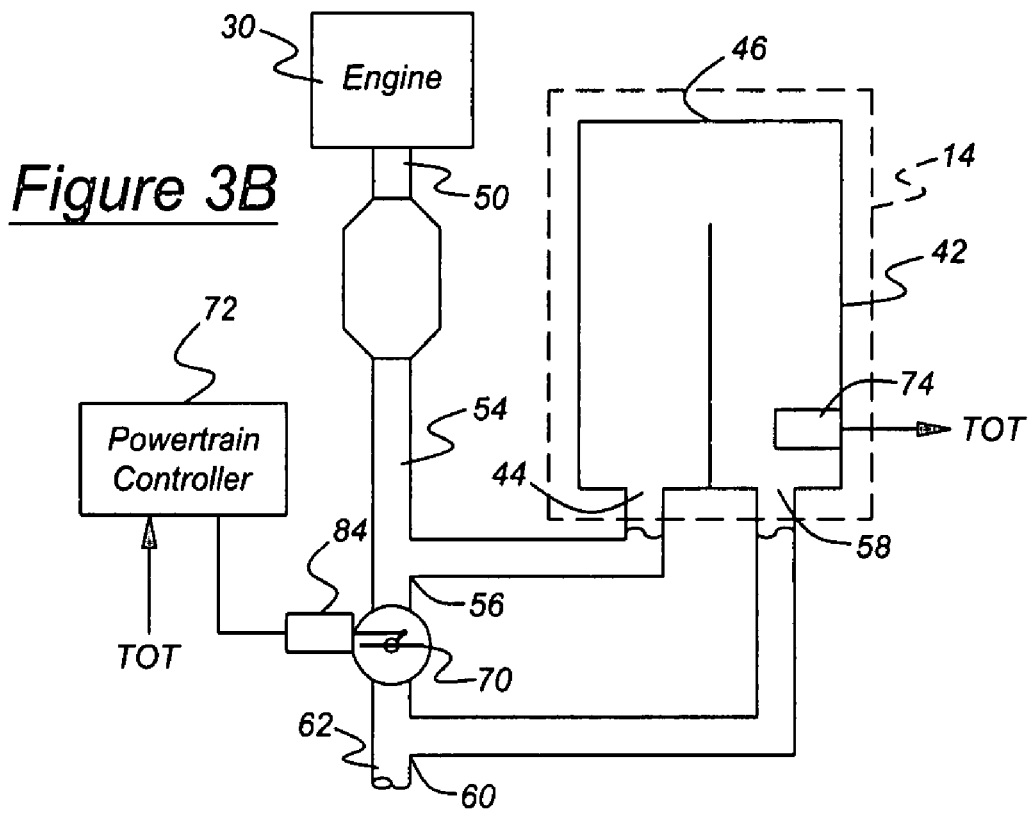

The torque converter 16 includes a bladed impeller wheel 28 driven by an engine 30 (see FIGS. 3A and 3B). A bladed turbine 32, arranged in toroidal fluid flow relationship with respect to the impeller 28 is driven hydrokinetically by the impeller and is driveably connected to the gearing 24. A bladed stator wheel, mounted on an overrunning brake, makes it possible for hydrokinetic torque multiplication to occur in the converter 16.

The torque converter is supplied with fluid by the hydraulic system located in the transmission case 12. Fluid is continually delivered to the oil pan from the hydraulic system and from the cooler. A positive displacement pump, driven by the engine, continually draws fluid from the oil pan 14 to the pump inlet and delivers fluid at the pump outlet to the hydraulic system. In this way, there is a continual flow of transmission fluid to and from the oil pan 14.

Figure 2:
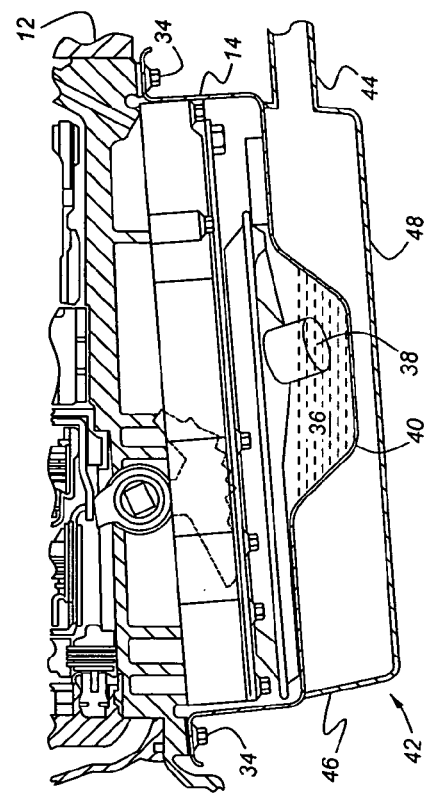
FIG. 2 is a cross sectional side view of a heat exchanger mounted on a transmission oil pan.

Referring now to FIG. 2, the oil pan 14 is fastened by bolts 34 to the lower surface of the case 12. The oil pan provides a reservoir 36 for containing fluid, which is drawn upward through a passage 38 to the pump inlet. The oil pan includes a lower surface 40, which forms a boundary of the reservoir by enclosing fluid in the oil pan.

A heat exchanger 42, secured to the oil pan 14, is located under the oil pan 14 below surface 40. Engine exhaust gas enters the heat exchanger through a port 44. The heat exchanger includes lateral panels 46 and a lower panel 48, which, together with surface 40 of the oil pan, form the boundaries of the exchanger, contain the exhaust gas and guide its passage though the exchanger 42. The exchanger has no top; surface 40 serves as the top of the heat exchanger.

FIG. 3 shows the system connected to the exhaust manifold 50 of the engine 30 through a catalytic converter 52, and an exhaust gas duct 54. The heat exchanger inlet 44 is connected to exhaust gas duct 54 through a first connection 56 located downstream of the catalytic converter 52. The outlet port 58 of the heat exchanger is connected through a second connection 60 to the exhaust gas duct 54, which lead to a tailpipe 62. Exhaust gas exits the system through the tail pipe 62. A baffle 64, located between ports 44 and 58 and extending vertically between surfaces 48 and 40, directs exhaust gas flow from inlet port 44 over and along surface 40 in two passes to outlet port 58. The baffle 64, which causes exhaust gas to flow directly from inlet port 44 to outlet port 58, enhances the exchange of heat to the oil in the oil pan 14. The heat exchanger 42 operates to transfer heat from the exhaust gas to the transmission oil through surface 40 and the other surfaces of the oil pan during a warm-up period.

The exhaust pipe exhaust gas duct 54 accommodates a control valve 70, which opens and closes duct 54 in response to signals produced by a powertrain controller 72. When valve 70 is closed, as shown in FIG. 3B, it permits exhaust gas to flow to and through the heat exchanger 42. When valve 70 is open, as shown in FIG. 3A, it causes exhaust gas to bypass the heat exchanger 42 and to flow directly to the tail pipe 62. Valve 70 is designed to be failsafe open, i.e., in the event of a system failure, it will open and direct exhaust flow to the tailpipe without preheating transmission fluid.

Figure 4:
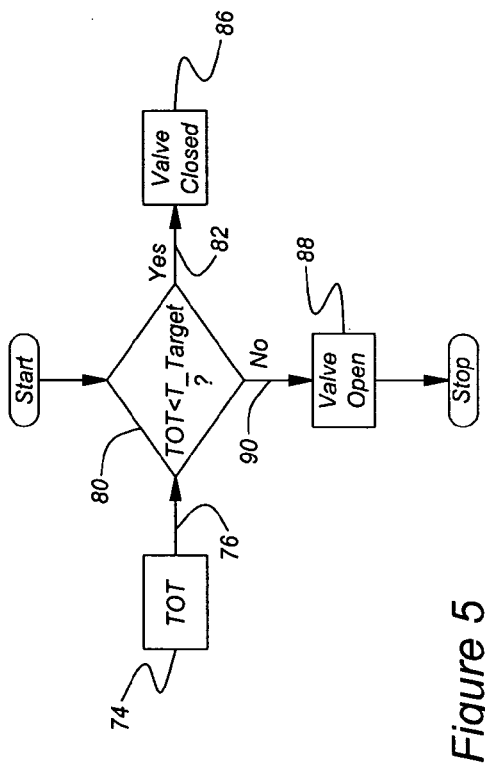
FIG. 4 is a diagram of logic for controlling the flow control valve in the system of FIG. 3.

The control function illustrated in FIG. 4 is resident in the controller 72, preferably in the form of a coded, computer readable control algorithm executed by the CLU and stored in electronic memory accessible to the CLU. A temperature sensor 74 monitors transmission oil temperature (TOT) and produces a signal 76 representing TOT, which signal is received as input by the controller 72.

When the vehicle key is turned to the ON position, START at step 78, the controller repetitively monitors TOT at 80, and produces a command signal 82 that energizes an actuator, such as a solenoid or relay 84, which closes valve 70 at step 86, allowing exhaust gas to enter the transmission heat exchanger 42 and to warm the transmission fluid. When the transmission oil temperature reaches a target magnitude, T_Target, at step 88 the controller issues a command signal 90 that causes the actuator 84 to open the flow control valve 70, its normal state, allowing exhaust gas to flow directly to the tailpipe and to bypass the heat exchanger.

The primary input parameter to the control is the transmission oil temperature 76. However, the control can also monitor ambient air temperature, and dynamically vary the target temperature T_Target to optimize fuel economy under driving conditions.

Figure 5:
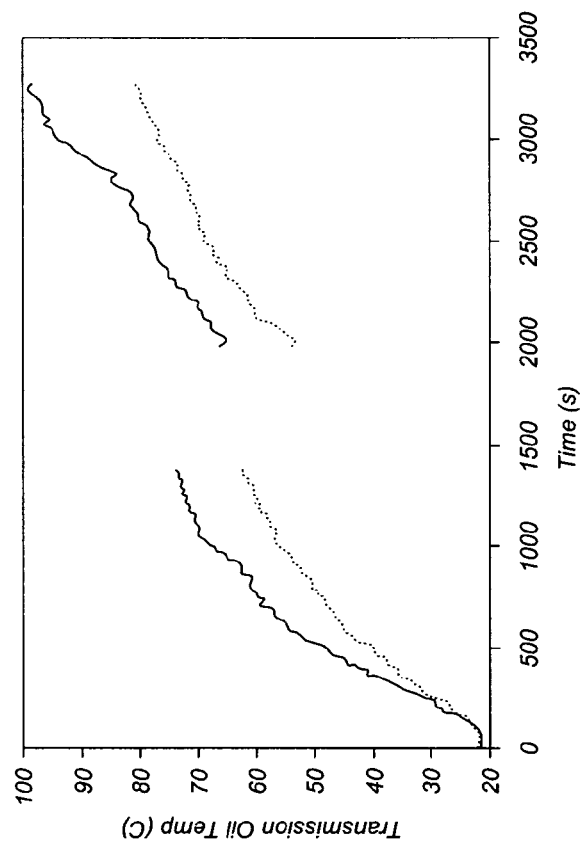
FIG. 5 is a graph showing the variation of transmission oil temperature with time during the Metro-Highway cycle using the system of FIGS. 3A and 3B.

The use of the engine exhaust gas heat exchange system of this invention has been shown to increase transmission oil temperatures by an average of 6° C. at the end of the city portion of the driving cycle, and by approximately 10° C. at the end of the highway portion of the driving cycle. FIG. 5 is a graph showing the variation of transmission oil temperature with time during the Metro-Highway cycle using the system of FIGS. 3A and 3B. Fuel economy increased by 1.66% in the city mode and 0.91% in the highway mode, with an overall gain of 1.4%.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for heating transmission fluid, comprising:
   an oil pan secured to a transmission case for containing hydraulic fluid, including a surface at least partially enclosing the fluid within the oil pan;
   a supply duct for carrying exhaust gas from an engine;
   a heat exchanger secured to the oil pan, communicating through a first connection with the supply duct, and defining a flow path of exhaust gas along the surface through the heat exchanger for transferring heat from the exhaust gas to fluid contained in the oil pan, the heat exchanger further comprising surfaces enclosing the exhaust gas in the heat exchanger, the heat exchanger having an opening bounded by the enclosing surfaces, the opening being at least partially closed by the surface of the oil pan; an inlet port passing through a surface of the heat exchanger and communicating with the supply duct; an exhaust port passing through a surface of the heat exchanger and communicating with the supply duct; and a baffle located between the inlet part and exhaust port for directing flow of exhaust gas in the heat exchanger along the surface of the oil pan;
   an exhaust duct communicating through a second connection with the supply duct, and connected to the heat exchanger for carrying engine exhaust gas from the heat exchanger to the supply duct; and
   a valve located between the first connection and second connection for opening and closing the supply duct to the flow of exhaust gas between the first connection and second connection.

2. The system of claim 1, further comprising:
   an engine exhaust manifold; and
   a catalytic converter for connection to the engine exhaust manifold, and located in an exhaust gas flow path between the engine exhaust manifold and first connection.

3. The system of claim 1, wherein closing the valve directs exhaust gas through the first connection to the heat exchanger, and opening the valve causes exhaust gas to bypass the heat exchanger.

4. The system of claim 1, wherein the heat exchanger further comprises:
   surfaces enclosing the exhaust gas in the heat exchanger, the heat exchanger having an opening bounded by the enclosing surfaces, the opening being closed by the surface of the oil pan.

5. A system for heating transmission fluid, comprising:
   an oil pan for containing hydraulic fluid supplied to a transmission;
   a supply duct for carrying exhaust gas from an engine;
   a heat exchanger secured to the oil pan, communicating with the supply duct, and defining a flow path of exhaust gas along a surface of the oil pan, for transferring heat from the exhaust gas to the oil pan, the heat exchanger further comprising surfaces enclosing the exhaust gas in the heat exchanger, the heat exchanger having an opening bounded by the enclosing surfaces, the opening being at least partially closed by the surface of the oil pan; an inlet port passing through a surface of the heat exchanger and communicating with the supply duct; an exhaust port passing through a surface of the heat exchanger and communicating with the supply duct and a baffle located between the inlet port and exhaust port for directing flow of exhaust gas in the heat exchanger along the surface of the oil pan;
   an exhaust duct communicating with the supply duct and connected to the beat exchanger for carrying engine exhaust gas from the beat exchanger to the supply duct; and
   a valve directing exhaust gas to the beat exchanger from the exhaust duct, and for bypassing exhaust gas flow to the heat exchanger.

6. The system of claim 5, further comprising:
   an engine exhaust manifold; and
   a catalytic converter connected to the engine exhaust manifold and supply duct.

7. The system of claim 5, wherein the heat exchanger further comprises:
   surfaces enclosing the exhaust gas in the heat exchanger, the heat exchanger having an opening bounded by the enclosing surfaces, the opening being closed at least partially by a surface of the oil pan.

* * * * *